United States Patent [19]

Mao

[11] Patent Number: 5,647,969
[45] Date of Patent: Jul. 15, 1997

[54] METHOD AND SYSTEM FOR REMOVING IONIC SPECIES FROM WATER

[75] Inventor: Zhenhua Mao, Duluth, Ga.

[73] Assignee: Motorola, Inc., Schaumburg, Ill.

[21] Appl. No.: 500,300

[22] Filed: Jul. 10, 1995

[51] Int. Cl.$^6$ ............................ C02F 1/461; C02F 1/469
[52] U.S. Cl. ...................... 205/743; 205/758; 205/760
[58] Field of Search ................................ 205/742, 743, 205/753, 758, 760; 204/228, 242, 275

[56] References Cited

U.S. PATENT DOCUMENTS

| | | | |
|---|---|---|---|
| 3,919,062 | 11/1975 | Lundquist, Jr. et al. | 205/753 |
| 5,425,858 | 6/1995 | Farmer | 205/743 |
| 5,443,700 | 8/1995 | Hirose et al. | 204/149 |
| 5,547,581 | 8/1996 | Andelman | 205/742 |

*Primary Examiner*—Arun S. Phasge
*Attorney, Agent, or Firm*—Bruce E. Stuckman; Jeffrey G. Toler

[57] ABSTRACT

A process and system (100) for purifying water includes a pair of electrodes (52) with a gap (58) between the electrodes (52). The electrodes (52) are connected to a power supply (116) that places a voltage across the two electrodes (52). Raw water (51) is then passed through the electrodes (52) which captures a plurality of ionic species (224) resulting in purified water (64). A system (100) that takes advantage of this process has a container (102) that holds the pair of electrodes (52) or filter (102). A controller (120) connected to a current sensor (118) monitors the current across the electrodes (52) and adjusts a valve (108) based on the current. If the current is above a first threshold the water flow is decreased and if the current flow is below a second threshold the water flow is increased.

8 Claims, 5 Drawing Sheets

METHOD AND SYSTEM FOR REMOVING IONIC SPECIES FROM WATER

FIELD OF THE INVENTION

The present invention relates generally to water purification and more particularly to a method and apparatus for removing ionic species from water.

BACKGROUND OF THE INVENTION

Water purification for drinking and industrial use is critical to the functioning of our modern economy. One of the common methods used to filter water is reverse osmosis. Osmosis is the process by which pure water passes through a semipermeable membrane into aqueous solution (water with a dissolved substance) on the other side of the membrane. Osmotic pressure is the pressure exerted in forcing the pure water through the semipermeable membrane and into the aqueous solution. Reverse osmosis is the process of apply pressure greater than the osmotic pressure on the aqueous solution side of the semipermeable membrane. This forces the water through the semipermeable membrane that screens the dissolved substances in the aqueous solution. The problem with reverse osmosis is it inefficient. The process is very slow in producing purified water. In addition, the semipermeable membranes have to be replaced periodically, which adds to the expense associated with reverse osmosis.

Ion exchange, another common water purification technique, takes advantage of the fact that most impurities in water dissociate into ions. Ion exchangers contain cationic resins and anionic resins. The cationic resins consist of polymer beads charged with hydrogen ions. When water passes through the cationic resins the positively charged ions in the water are exchanged for the hydrogen ions. The water then passes through anionic resins that exchange hydroxide ions for the negatively charged ions. The hydrogen ions and the hydroxide ions combine to form water, thus eliminating the impurities in the water. Eventually, the resins become used up and need to be either replaced or regenerated. Both processes are expensive.

Thus, there exists a need for a method and apparatus that efficiently removes impurities from water and in which the filtration elements can be replaced or regenerated inexpensively.

DETAILED DESCRIPTION OF THE DRAWINGS

Figure 1:
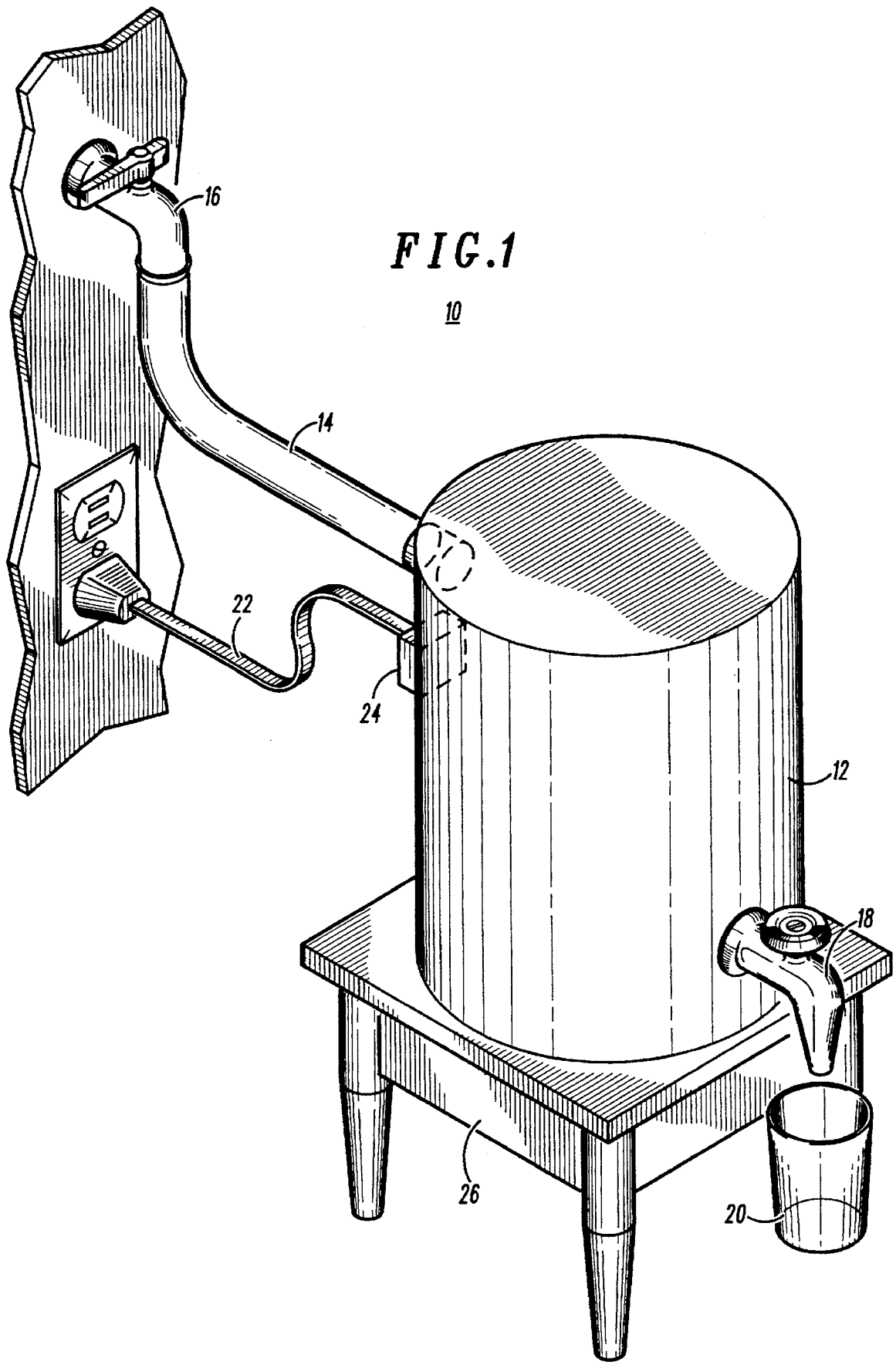
FIG. 1 is a perspective drawing of a water purification system.

The present invention provides a method and apparatus for efficiently purifying water. In addition, the present invention provides a filter that can be reactivated, inexpensively and easily. FIG. 1 shows a water filtration system 10. The water filtration system 10 has a container 12, with an input 14 connected to the raw water supply 16. An output 18 provides purified water to a glass 20 for drinking. The water filtration system 10 requires electrical power provide by an electrical cord 22. The electrical cord 22 is connected to an electrical box 24 that at least contains power conditioning equipment. A table 26 is shown supporting the container 12.

Figure 2:
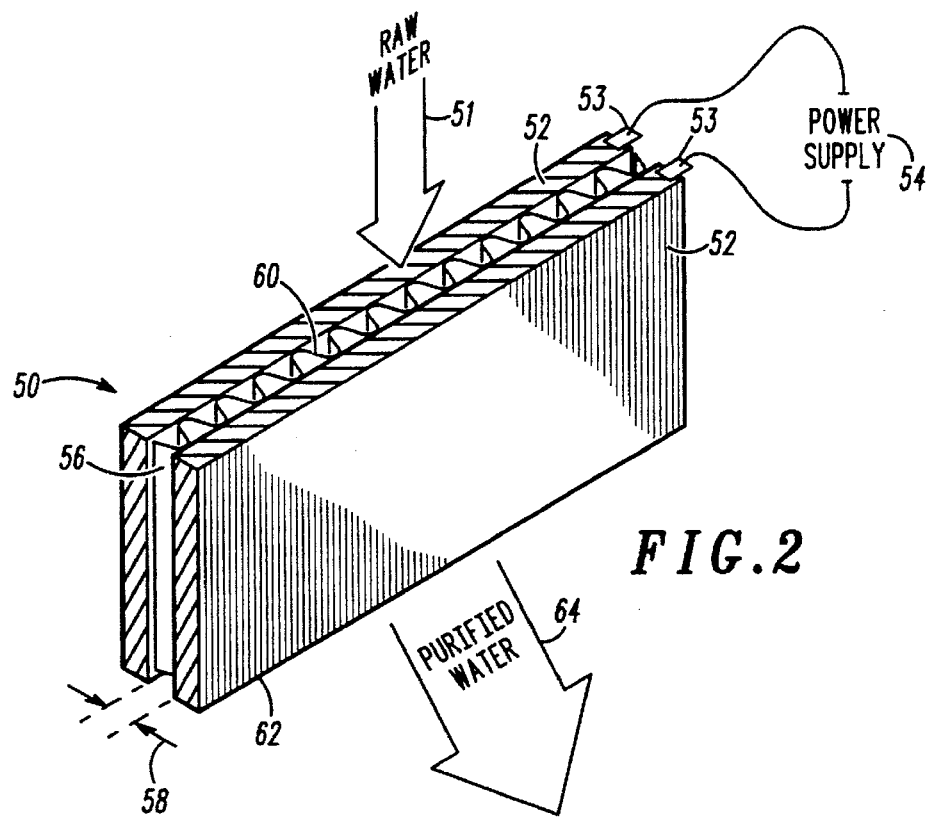
FIG. 2 is a perspective drawing of a water filter.

FIG. 2 shows a process and a filter 50 for purifying raw water 51. The filter 50 has a pair of electrodes 52 each having a lead 53 electrically connected to a device 54 for placing electrical charges on the pair of electrodes 52. The device 54 can be either a constant potential source or a constant current source. Between the pair of electrodes 52 is a spacer layer (or separation layer) 56, that is porous and electrically non-conductive. The spacer layer 56 creates a gap 58 between the two electrodes 52. After the electrical charges are placed on the two electrodes 52, raw water 51 is passed through a first side 60 of the pair of electrodes 52. On a second side 62 of the pair electrodes 52 purified water 64 is obtained.

The pair of electrodes 52 can be made of any insoluable substance that is electrically conductive. Preferably, the electrodes 52 are both ionic and electron conductive and the negative electrode is made from a cation conductive material, while the positive electrode is made from an anion conductive material. Activated carbon is the preferred material due to its low cost and high surface area. Other suitable materials include a mixture of activated carbon and polypyrrole or activated carbon and polyannilene. It is not required that both electrodes be made from the same material.

The separation layer 56 should provide a gap 58 of less 0.5 mm between the electrodes 52. Larger gaps result in a less efficient filtering process. The separation layer 56 needs to be electrically non-conductive and porous. Some of the materials that have been found suitable include, polypropylene, polyethylene and a plurality of glass beads.

Figure 3:
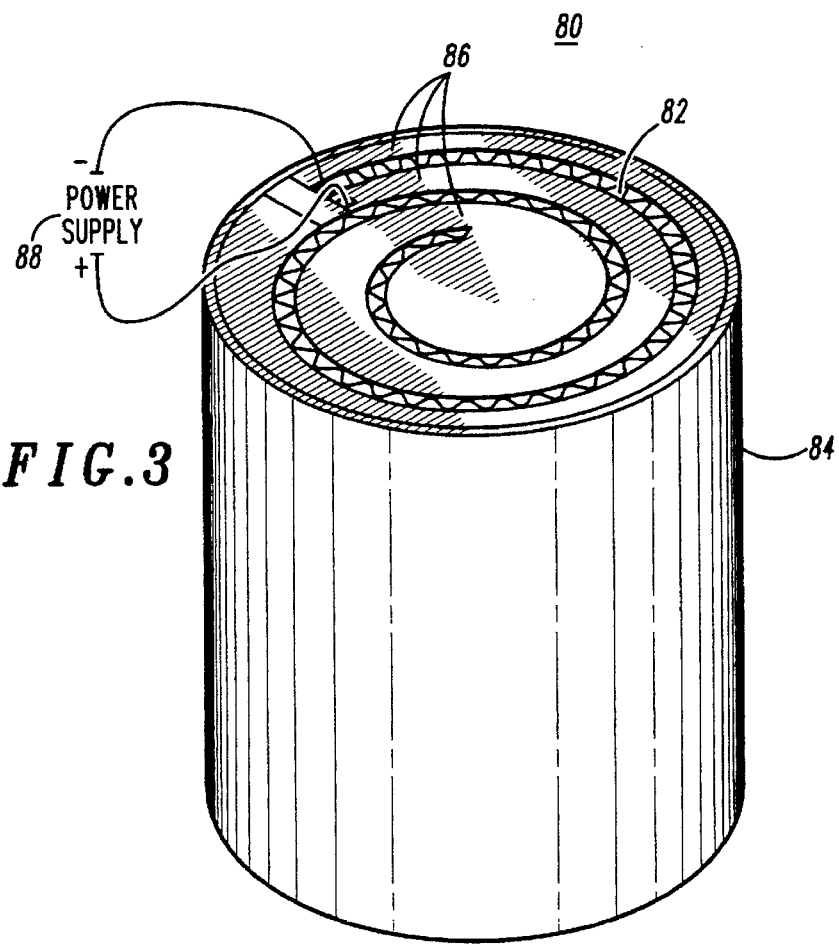
FIG. 3 is a perspective drawing of the water purification system, with the lid removed.

A system 80 that takes advantage of the filter 50 of FIG. 2 is shown in FIG. 3. The filter 82 is shown in a spiral inside of a container 84. A filler material 86 is placed around the filter 82 to insure that raw water does not leak into the purified water output. The filter 82 is shown connected to an electrical source (means for generating an electrical potential) 88. The electrical source 88 can be either a constant current power source of a regulated DC power supply.

Figure 4:
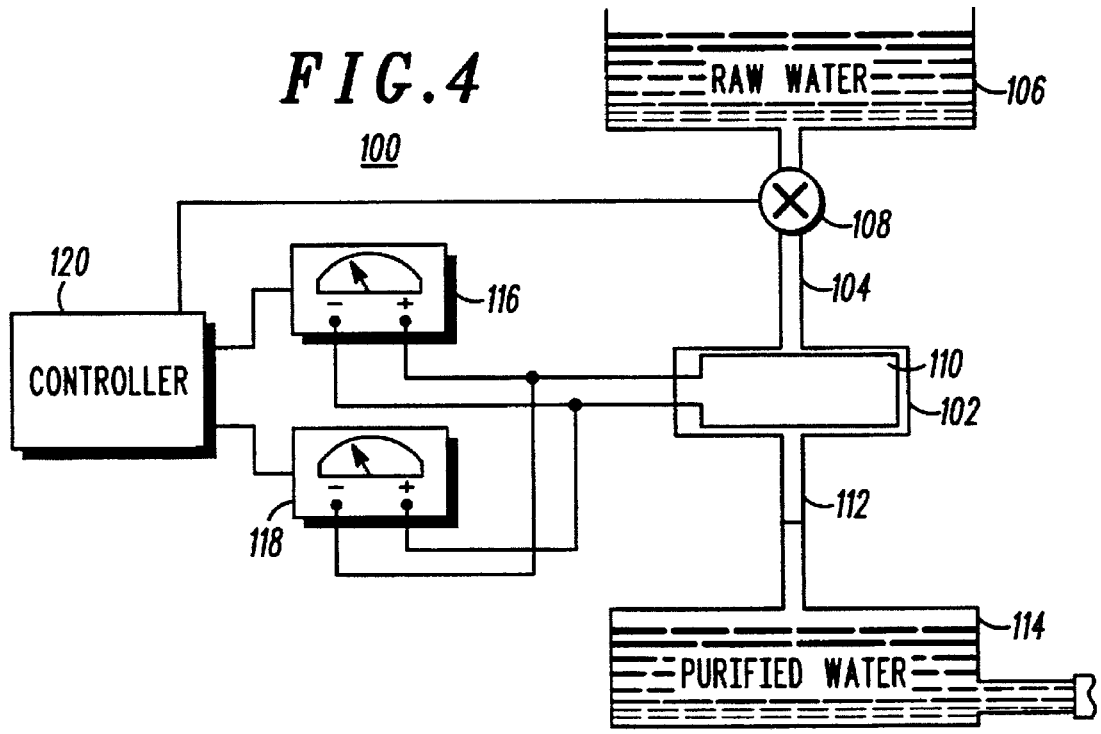
FIG. 4 is a schematic diagram of the of the water purification system.

FIG. 4 is an alternative embodiment 100 of the water purification system 80 of FIG. 3. The system 100 has a container 102 with an input 104 coupled to a raw water supply 106 through a valve 108. The raw water 106 is purified by a filter 110 of the same design as the filter 50 in FIG. 2. The purified water flows through an output 112 into a storage container 114, where it is held for future use. The filter 110 is electrically coupled to a regulated DC power supply 116 and a current sensor 118. A controller 120 is coupled to the power supply 116, the current sensor 118 and the valve 108. The controller 120 monitors the current and controls the valve 108 based upon the measured current. The current is directly proportional to the ionic species in the raw water.

Figure 5:
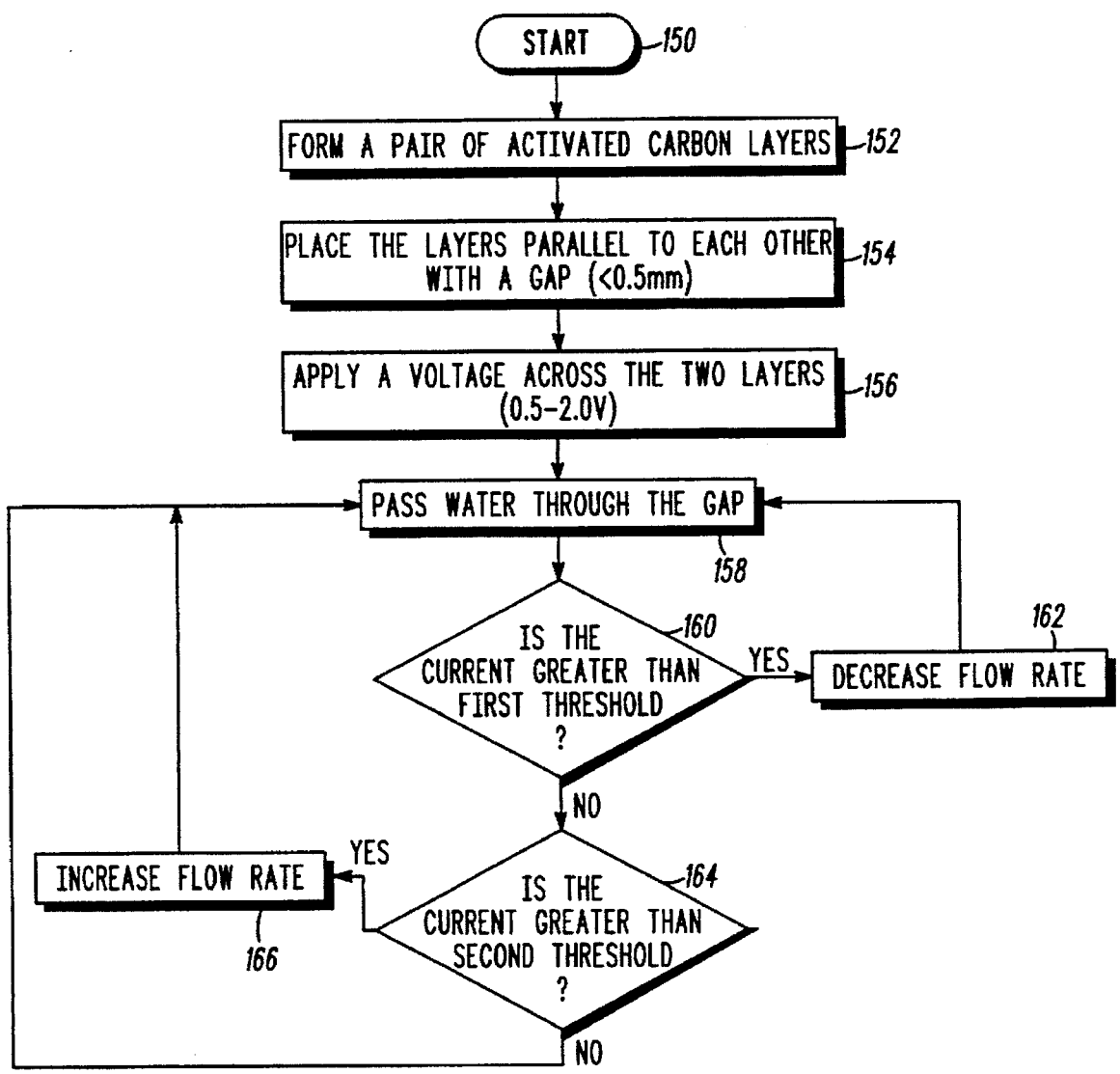
FIG. 5 is a flow chart of a process of purifying water.

FIG. 5 is a flow chart of the process used to purify raw water. The process starts at block 150. Next, a pair of activated carbon layers is formed at block 152. At block 154 the carbon layers are placed parallel to each other with a gap of less than 0.5 mm. A voltage of between 0.5 and 2.0 volts is applied across the two layers at block 156. Next, raw water is passed through the gap at block 158. At block 160 it is determined if the current through the electrodes exceeds a first threshold. If the current through the electrodes exceeds a first threshold, then the water flow is decreased at block 162. If the current through the electrodes does not exceed a first threshold, then it is determined if the current is less than a second threshold at block 164. If the current is less than a second threshold, then the water flow is increased at block 166. If the current is not less than a second threshold, then processing returns to block 158. This process adjusts the water flow rate based upon the measured current. When the current is too high, this indicates a condition where the filtering system is not removing enough ionic species. If the current is less than a certain threshold then the flow rate can be increased and still meet the purity requirements for the filtered water.

Figure 6:
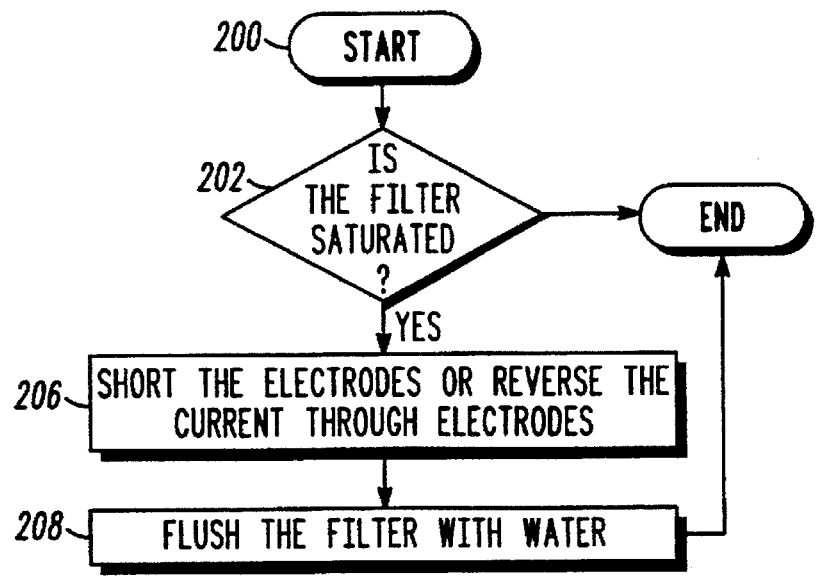
FIG. 6 is a flow chart of a process of reactivation a water filter.

Eventually, the electrodes will become saturated with filtered ionic species. The current through the electrodes decreases as the electrodes become laden with ionic species in a constant potential (voltage) filtration system. If a constant current filtration system is used, the voltage will increase as the electrodes become laden with ionic species. The quantity of ions removed, in a constant current filtration system, is proportional to the current and the saturation point is determined by monitoring the voltage. FIG. 6 is a flow chart of the process used to reactivate the filter (electrodes). The process starts at block 200. Next, it is determined at block 202 if the filter has become saturated. The process ends at block 204, if the filter is not saturated. If the filter has become saturated, the electrodes are either electrically shorted or a reverse current is applied through the electrodes at block 206. The filter is flushed with water at block 208. By shorting the electrodes or reversing the current on the electrodes, the electrical attraction holding the ionic species to the electrodes is eliminated, allowing the ionic species to be easily washed away. If the current is reversed it is possible to create a repelling electrical force between the ionic species and the electrodes.

Figure 7:
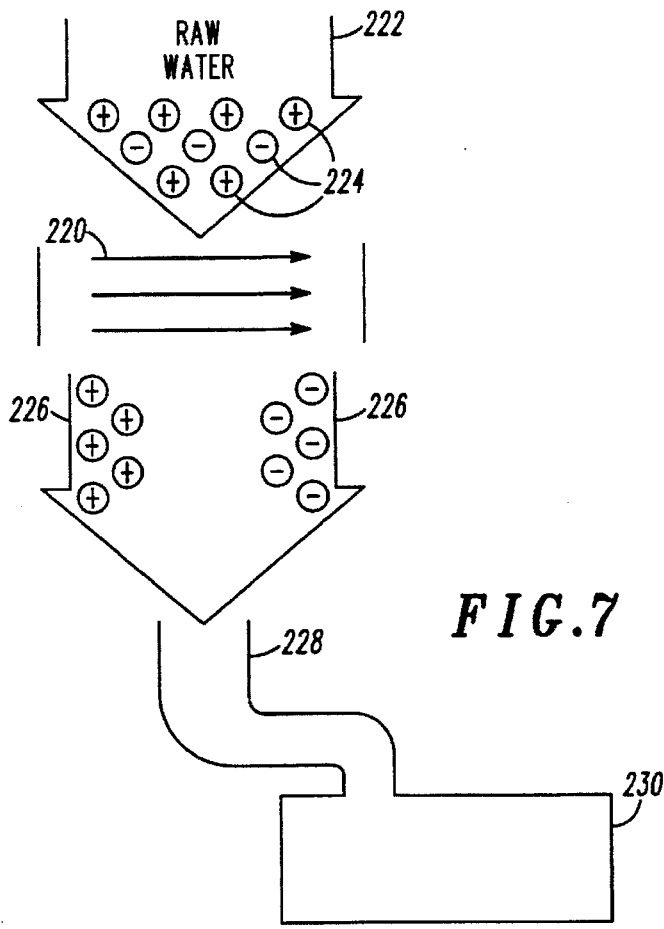
FIG. 7 is a schematic diagram of an alternative embodiment of the water purification system of FIG. 4.

FIG. 7 shows an alternate embodiment of the invention. An electrical field 220 is generated. Raw water 222 containing a plurality of ionic species 224 is passed through the electrical field 220, forcing the ionic species to the edges 226 of the water flow. The central water stream is captured by a pipe 228 for instances, and the purified water is stored in a tank 230 for later use. The edges 226 of the water stream are discarded.

Figure 8:
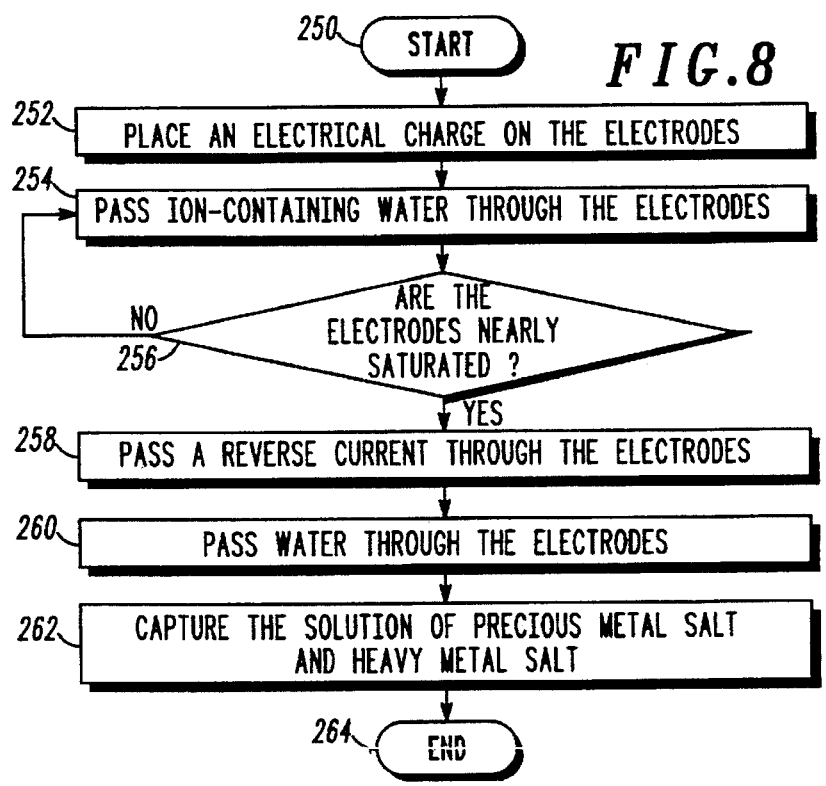
FIG. 8 is a flow chart of a process for recovering a precious metal salt and for concentrating a heavy metal salt.

The filter 102 of the water purification 100 will eventually become saturated with ionic species, as discussed above with respect to FIG. 6. If the ionic species are either a precious metal salt and or a heavy metal salt, environmental regulations require that these be recovered and not released into the water supply. Both of these are valuable commodities and the filter reactivating process can be used to recover these valuable commodities. A process specifically designed to recover these valuable commodities is shown in FIG. 8. The process starts at block 250. Next, an electrical charge is placed on the electrodes, at block 252. Ion containing water is then passed through the electrodes, at block 254. At block 256, it is determined if the electrodes are nearly saturated. If the electrodes are not nearly saturated, the processing returns to block 254. If the electrodes are nearly saturated, then a reverse current is passed through the electrodes, at block 258. A reverse current is a current that discharges the saturated electrodes. A small amount of water is then passed through the electrodes, at block 260, to flush the ionic species from the electrodes. The solution of ionic species containing precious metal salt and heavy metal salt is captured, at block 262. The process ends at block 264. The solution can then be efficiently processed to recover the precious metals and heavy metals.

There has been described an apparatus and method for purifying water, that is efficient and allows the filter to be reactivated in-situ and cost effectively. While the invention has been described in conjunction with specific embodiments thereof, it is evident that many alternatives, modifications, and variations will be apparent to those skilled in the art in light of the foregoing description. Accordingly, it is intended the invention embrace all such alternatives, modifications, and variations as fall within the spirit and broad scope of the appended claims.

What is claimed is:

1. A method of purifying water comprising the steps of:

providing a pair of electrodes formed from activated carbon layers substantially parallel to each other with a gap therebetween;

applying a voltage across the pair of activated carbon layers;

passing raw water at a water flow rate through the gap;

measuring a current through the activated carbon layers;

comparing the measured current to a first threshold;

decreasing the water flow when the current exceeds the threshold;

comparing the measured current to a second threshold; and increasing the water flow rate when the current is less than the second threshold.

2. The method of claim 1, wherein the voltage applied across the pair of activated carbon layers is between one half and two volts.

3. The method of claim 1, further comprising the steps of determining when the pair of electrodes are nearly saturated with a plurality of ion-species;

passing a reverse current through the pair of electrodes;

passing water through the pair of electrodes forming solution; and capturing the solution, wherein the solution contains the precious metal salt and the heavy metal salt.

4. The method of claim 1, further comprising the step of reactivating the two electrodes by electrically shorting the two electrodes and passing water between the two electrodes.

5. The method of claim 1, further comprising the step of determining when the activated carbon layers require reactivating by monitoring the current.

6. The method of claim 1, further comprising the step of determining when the activated carbon layers require reactivating by monitoring the applied voltage.

7. The method of claim 1, wherein the gap is less than 0.5 millimeters.

8. The method of claim 7, wherein the gap comprises a spacer layer.

* * * * *